United States Patent [19]
Oda et al.

[11] Patent Number: 5,340,781
[45] Date of Patent: Aug. 23, 1994

[54] SPHERICAL CORUNDUM PARTICLES, PROCESS FOR PREPARATION THEREOF AND RUBBER OR PLASTIC COMPOSITION HAVING HIGH THERMAL CONDUCTIVITY AND HAVING SPHERICAL CORUNDUM PATICLES INCORPORATED THEREIN

[75] Inventors: Yukio Oda, Fujisawa; Jun Ogawa, Kawasaki, both of Japan

[73] Assignee: Showa Denko Kabushiki Kaisha, Tokyo, Japan

[21] Appl. No.: 921,376

[22] Filed: Jul. 29, 1992

Related U.S. Application Data

[60] Division of Ser. No. 666,442, Mar. 11, 1991, abandoned, which is a continuation of Ser. No. 196,206, Mar. 14, 1988, abandoned.

[30] Foreign Application Priority Data

Jul. 14, 1986 [JP] Japan ................................ 61-163719

[51] Int. Cl.$^5$ .......................... C04B 35/10; C01F 7/02; B29B 9/10
[52] U.S. Cl. .................................... 501/127; 423/625; 264/5; 264/15
[58] Field of Search .................. 501/127; 423/625; 264/5, 15

[56] References Cited

U.S. PATENT DOCUMENTS

| | | | |
|---|---|---|---|
| 1,037,999 | 9/1912 | Saunders | 501/127 |
| 2,630,616 | 3/1953 | Robinson | 428/402 |
| 3,353,910 | 11/1967 | Cornelius | 428/402 |
| 4,307,147 | 12/1981 | Ohishi et al. | 427/96 X |
| 4,308,088 | 12/1981 | Cherdron et al. | 423/625 X |
| 4,374,119 | 2/1983 | Schepers | 423/625 |
| 4,477,427 | 10/1984 | Mátyasi et al. | 423/625 X |
| 4,574,073 | 3/1986 | Meyer | 423/111 |
| 4,650,819 | 3/1987 | Nakamoto et al. | 523/223 |
| 4,818,515 | 4/1989 | Ceresa | 423/624 |
| 5,149,520 | 9/1992 | Sucech et al. | 423/628 X |
| 5,273,619 | 12/1993 | Masahiro et al. | 501/127 X |

FOREIGN PATENT DOCUMENTS

| | | | |
|---|---|---|---|
| 0009634 | 1/1980 | Japan | 523/440 |
| 60-094455 | 5/1985 | Japan | 524/430 |
| 0281133 | 12/1986 | Japan | 524/430 |
| 62-240313 | 10/1987 | Japan | 523/440 |

*Primary Examiner*—Karl Group
*Assistant Examiner*—David Sample
*Attorney, Agent, or Firm*—Sughrue, Mion, Zinn, Macpeak & Seas

[57] ABSTRACT

Disclosed are spherical corundum particles consisting essentially of single particles having an average particle size of 5 to 35 μm and a shape not including cutting edges. The particles are prepared by adding one or more members selected from halogen compounds, boron compounds, and alumina hydrates to pulverized alumina having a specific particle size, heat-treating the mixture at a temperature of at least 1000° C., and disintegrating the heat-treated product. A rubber or plastic composition having a high thermal conductivity is formed by incorporating such particles into a rubber or plastic, and this composition is valuable as a sealing material for a semiconductor, etc.

10 Claims, 1 Drawing Sheet

SPHERICAL CORUNDUM PARTICLES, PROCESS FOR PREPARATION THEREOF AND RUBBER OR PLASTIC COMPOSITION HAVING HIGH THERMAL CONDUCTIVITY AND HAVING SPHERICAL CORUNDUM PATICLES INCORPORATED THEREIN

This is a division of application Ser. No. 07/666,442, filed Mar. 11, 1991 now abandoned, which is a continuation of application Ser. No. 07/196,206 filed Mar. 14, 1988, now abandoned.

TECHNICAL FIELD

The present invention relates to spherical corundum particles without cutting edges, and having an excellent less abrasive property and flow characteristic and valuable as a filler for a sealing material for electronic parts, a finishing additive or base material, a starting material of a wrapping material, and an additive or base material for refractories, glass or ceramics, a process for the preparation of such corundum particles, a rubber or plastic composition having a high concentration of such corundum particles incorporated therein, and having a high thermal conductivity and a low thermal expansion coefficient, and an electrical or electronic part formed by using this rubber or plastic composition.

BACKGROUND ART

Recent increases in the degree of integration and density in electronic parts have increased the power consumption per chip, and therefore, an important problem has arisen of how efficiently the generated heat is radiated or how effectively the elevation of the temperature is suppressed. Accordingly, the development of a material having an excellent thermal conductivity, which is suitable as an insulating sealing material for semiconductors, a material for a substrate on which parts are mounted, and a peripheral material such as a heat-radiating spacer, is demanded.

Another problem concerning heat is how to best maintain the conformity of the thermal expansion coefficient of an element and of an insulating material for sealing the element. If there is a difference in the thermal expansion coefficient, the thermal stress is repeatedly applied to the bonding portion by the heat cycle when the operation of an integrated circuit (IC) is stopped with the result that the element is damaged. In general, since a resin has a high thermal expansion coefficient, an inorganic filler having a low thermal expansion coefficient is incorporated into the resin to match the thermal expansion coefficient with that of the element.

For example, an epoxy resin containing about 70% by weight of fused silica is generally used as an insulating sealing material for a large-scale integrated circuit (LSI), because of a low thermal expansion coefficient and a good conformability. However, since fused silica has an extremely low thermal conductivity, this epoxy resin material is not suitable for use in a field where heat radiation is very important. Accordingly, a composition having a thermal conductivity of about $60 \times 10^{-4}$ cal/cm·sec·°C., which is formed by filling a large amount of crystalline silica having a high thermal conductivity, is already in practical use. However, crystalline silica having a high thermal conductivity has a defect of a high thermal expansion coefficient. Therefore, the above two problems concerning heat, that is, the problems of heat radiation and thermal expansion conformation, cannot be solved by the use of fused silica or crystalline silica alone.

When fused silica and crystalline silica are simultaneously incorporated, since crystalline silica has a high Mohs hardness and comprises pulverized particles having irregular sharp cutting edges, if the amount of crystalline silica incorporated is increased, the flowability of the composition is drastically reduced and the wear of a kneader or a forming mold is greatly increased, and therefore, the amount of crystalline silica incorporated is restricted. As a means of reducing the wear, a method can be mentioned in which fused silica having a specific particle size distribution and a low abrasive property is used as a coarse particle fraction and mixed with a fine particle fraction of crystalline silica having a specific particle size distribution, to provide a composition having an excellent flowability and a reduced wear of a mold, as disclosed in Japanese Unexamined Patent Publication No. 58-164250. However, even in this composition, a reduction of the thermal conductivity due to fused silica cannot be avoided.

At present, even in a sealing material having a high thermal conductivity, the thermal conductivity is $60 \times 10^{-4}$ cal/cm·sec·°C. at highest, and a level of $100 \times 10^{-4}$ cal/cm·sec·°C. desired as the next target cannot be reached by using crystalline silica. Accordingly, $\alpha$-alumina, aluminum nitride, and silicon carbide are under consideration as the filler having a higher thermal conductivity than that of crystalline silica, and alumina is promising as the substitute for silica because alumina is relatively inexpensive, has a stable quality, and has a good general-purpose property.

However, in view of the characteristics of existing alumina, existing alumina cannot be considered suitable as a filler for rubbers or plastics. For example, alumina prepared according to the Bayer process consists of irregular-shaped or plate-like primary particles having a size of several $\mu$m to about 10 $\mu$m at largest. Since this alumina has a large oil absorption, the filling property in rubbers or plastics is poor and the amount filled is limited to about 80% by weight, such that if alumina is incorporated, for example, into an epoxy resin, the thermal conductivity is $60 \times 10^{-4}$ cal/cm·sec·°C. at highest. It is known that alumina formed by pulverizing electrofused alumina or sintered alumina is usable as a material of an abrasive or refractory. Since alumina of this type consists of dense corundum particles and the particle size can be optionally adjusted within a broad range of from a fine particle size to a coarse particle size of scores of $\mu$m, the oil absorption is small and the filling property in rubbers or plastics is excellent. However, the pulverized particles of alumina of this type have many sharp angles and corundum ($\alpha$-Al$_2$O$_3$) has a high Mohs hardness. Therefore, the abrasive property is larger than that of crystalline silica having the same particle size, and corundum has a defect in that bonding wires or semi-conductor elements are damaged thereby.

A rounded spherical shape having no cutting edges is desirable for alumina particles. As the process for preparing spherical alumina particles, a flame-spraying process is known in which alumina according to the Bayer process is sprayed into a high-temperature plasma or oxyhydrogen flame, and the alumina is fused and then rapidly cooled to form spherical particles. However, this process is economically disadvantageous in that the heat consumption is large, and although the obtained alumina is composed mainly of $\alpha$-Al$_2$O$_3$ it generally contains α-Al₂O₃ as a subsidiary component. The presence of this subsidiary component is unpreferable because the thermal conductivity of alumina is decreased by the subsidiary component.

As a means for solving the foregoing problems of the conventional techniques, several processes have been proposed for preparing α-Al₂O₃ (corundum) particles having a particle size larger than 5 μm and a regular shape. For example, Japanese Examined Patent Publication No. 60-33763 discloses a process in which aluminum hydroxide having a high sodium content is preliminarily dehydrated, a specific mineralizing agent is added to the dehydration product, and the mixture is calcined in a rotary kiln to obtain coarse particles of alumina. Furthermore, Japanese Unexamined Patent Publication No. 58-181725 discloses a process in which a mineralizing agent containing fluorine and/or boron is added to dry-type absorption alumina and the mixture is calcined in a rotary kiln to obtain similar coarse particles of alumina. However, coarse particles of alumina prepared according to these processes have a shape including regular cutting edges, as shown in the drawing (microscope photograph) of Japanese Unexamined Patent Publication No. 58-181725, and do not possess a rounded spherical shape. Moreover, Japanese Unexamined Patent Publication No. 56-35494 (U.S. Pat. No. 4,307,147) discloses a substrate having a covering film composed of a dispersion of polygonal corundum particles in an organic polymer. These corundum particles, however, are angular and do not possess a rounded spherical shape.

It is considered that, if spherical corundum particles in which sharp cutting edges are eliminated to reduce the abrasive and wearing properties are used and incorporated as a filler in a resin, a rubber or plastic composition having a good filling property, a reduced abrasive and wearing property, an excellent thermal conductivity, and a high thermal conductivity optimal for an insulating sealing material or the like, will be obtained. However, the kind of the resin in which such spherical corundum particles are to be incorporated, the amount added of the particles, and the incorporation method have not been investigated in detail, and a rubber or plastic composition having a high thermal conductivity and practically usable as a sealing material has not yet been developed.

DISCLOSURE OF THE INVENTION

Under this background, research was made into the developing of corundum composed of particles having reduced abrasive and wear properties, which is suitable as a filler, a scratch-free wrapping material or a base material of a ceramic or refractory material, without degradation of the inherent characteristics of corundum particles, such as thermal conductivity, electrical insulating characteristic, and hardness, and as a result, the present invention was completed.

More specifically, in accordance with the present invention, there are provided (1) spherical corundum particles consisting substantially of single particles having an average particle size of 5 to 35 μm and having a shape not including cutting edges, and optionally, having an α-ray radiant quantity smaller than 0.01 C/cm²·hr, and (2) a process for the preparation of spherical corundum particles as mentioned above, which comprises adding at least one member selected from the group consisting of halogen compounds, boron compounds, and alumina hydrates to a pulverization product of at least one member selected from the group consisting of electrofused alumina and sintered alumina, which has a specific particle size, heat-treating the mixture at a temperature of at least 1000° C., preferably 1000° to 1550° C., and disintegrating the heat-treated product.

Furthermore, in accordance with the present invention, there is provided (3) a rubber or plastic composition having a high thermal conductivity comprising spherical corundum particles having a maximum particle size smaller than 150 μm and an average particle size of at least 10 μm as single particles, and a shape not including cutting edges. In accordance with a preferred embodiment of the present invention, whereby an excellent effect of reducing burrs is realized at the step of molding a sealing material for a semiconductor, there is provided (4) a rubber or plastic composition having a high thermal conductivity which comprises alumina consisting of 1 to 20% by weight of fine alumina particles having an average particle size smaller than 5 μm, the remainder of the alumina consisting of spherical corundum particles having a maximum size of a single particle that is smaller than 150 μm, an average particle size of at least 10 μm, and a shape not including cutting edges. Moreover, in accordance with another preferred embodiment of the present invention, whereby an excellent effect of reducing the viscosity of a composition is realized upon incorporation in a liquid rubber or plastic, there is provided (5) a composition having a high thermal conductivity and comprising at least one member selected from rubbers and plastics and, incorporated therein, at least 75% by weight, based on the total composition, of alumina consisting of 10 to 30% by weight of fine alumina particles having an average particle size smaller than 5 μm, the remainder of the alumina consisting of spherical corundum particles having an average particle size of at least 10 μm and a shape not including cutting edges.

BRIEF DESCRIPTION OF THE DRAWINGS

FIG. 1A, 1B, 2A, and 2B are scanning electron microscopes (2500 magnifications) of corundum particles, in which FIG. 1A shows corundum particles obtained in Example 1, FIG. 1B shows corundum particles obtained in Example 2, FIG. 1C shows corundum particles obtained in Comparative Example 1 and FIG. 2B shows corundum particles obtained in Comparative Example 2.

BEST MODE FOR CARRYING OUT THE INVENTION

Figure 1A:

It was noted that a pulverized product of electrofused alumina or sintered alumina, which has been used as an abrasive material or a fine aggregate of a refractory material, having an average particle size of 5 to 35 μm, preferably 10 to 25 μm (for example, RW 220F or SRW 325F supplied by Showa Denko) has a particle size distribution which is substantially the same as the particle size distribution of a pulverization product of fused silica or crystalline silica (α-SiO₂) used at present as a filler of a sealing material for an electronic part. Since such alumina has been molten or heat-treated at a high temperature such as 1500° to 1850° C., the crystal of alumina is fully developed and the pulverized product has a particle size distribution desirable for a filler. However, since sharp cutting edges are formed at the pulverizing step as mentioned above, the pulverized product is not put to practical use as a filler. Accordingly, research was made with a view to improving the shape of the particles while retaining this preferred particle size distribution, and as a result, it was found that, if a small amount of a known chemical heretofore used as a mineralizing agent or crystal-growing agent for alumina, such as a halogen compound or a boron compound, is incorporated into a pulverized product of electrofused alumina or sintered alumina, and the mixture is heat-treated at a temperature of at least 1000° C., sharp angles, that is, cutting edges, of coarse particles of alumina are decreased and simultaneously, the shape is made spherical. The present invention was completed based on this finding.

Electrofused alumina or sintered alumina prepared according to a known process can be used as starting coarse particles of alumina in the present invention. The particle size distribution, determined according to the sedimentation method, of the pulverized product of electrofused or sintered alumina is such that the average particle size is 5 to 35 $\mu$m, preferably 10 to 25 $\mu$m, and the maximum particle size is not larger than 150 $\mu$m, preferably not larger than 74 $\mu$m. Where the average particle size of intended spherical corundum particles is smaller than 5 $\mu$m, since particles having a rounded shape can be obtained by a known process comprising adding a crystal-growing agent to aluminum hydroxide, the present invention need not be applied. If the average particle size of the starting material exceeds 35 $\mu$m or the proportion of particles having a size larger than 150 $\mu$m is increased, the effect of reducing cutting edges of the coarse particles is insufficient and good results cannot be obtained. It was found that, if an alumina hydrate, especially aluminum hydroxide or alumina gel, or finely divided alumina having a good thermal reactivity is added to electrofused alumina or sintered alumina and the mixture is heat-treated, the sphericalizing of coarse particles is effectively promoted. From the economical viewpoint, aluminum hydroxide according to the Bayer process (gibbsite crystal) is preferred, and most preferably, the average particle size is smaller than 10 $\mu$m. By observation, it was surprisingly confirmed that this sphericalizing promoter acts synergistically on coarse particles of alumina, with chemicals described hereinafter, and irregular and sharp cutting edges are selectively absorbed to sphericalize the coarse particles. As a subsidiary effect, the cohesive force of agglomerates of the heat-treated product is decreased if an alumina hydrate such as aluminum hydroxide or alumina gel is added, and as a result, disintegration into primary particles can be easily accomplished. The optimum amount added of the sphericalizing promoting agent depends on the particle size of the pulverized product of electrofused alumina or sintered alumina, but in the case of aluminum hydroxide, preferably the amount added of aluminum hydroxide is 5 to 100 parts by weight (calculated as alumina) based on electrofused alumina or sintered alumina. If the amount of aluminum hydroxide is smaller than 5 parts by weight, the cohesive force of the agglomerates becomes strong, and if the amount of aluminum hydroxide exceeds 100 parts by weight, excessive aluminum hydroxide is included in the form of free fine particles of alumina in the product and good results cannot be obtained.

At least one member selected from known crystal-growing agents for alumina is used as the chemical added at the heat treatment. Namely, halogen compounds, especially fluorine compounds such as $AlF_3$, $NaF$, $CaF_2$, $MgF_2$, and $Na_3AlF_6$, and/or boron compounds such as $B_2O_3$, $H_3BO_3$, and $mNa_2O.nB_2O_3$ are preferred, and a mixture of a fluoride and a boron compound and a boro-fluoride compound is particularly preferred. The amount added of the chemical depends on the heating temperature, the residence time in the furnace, and the kind of heating furnace, but it was found that a good effect is attained if the chemical is added in an amount of 0.1 to 4.0% by weight based on the total alumina. Known means such as a single furnace, a tunnel furnace, and a rotary kiln can be used as the heating furnace. Where an alumina hydrate such as aluminum hydroxide is made present together with the chemical, the heating temperature should be higher than the temperature at which the alumina hydrate is substantially converted to $\alpha$-alumina, that is, about 1150° C., and if the alumina hydrate is not made present, the intended object of the present invention can be attained by a heating temperature higher than 1000° C. In each case, a preferred heating temperature is in the range of 1350° to 1550° C. When the heating temperature is higher than 1550° C., even if aluminum hydroxide is present, the cohesive force of the agglomerates is increased and disintegration to primary particles cannot be easily accomplished. The residence time in the heating furnace depends on the heating temperature, but in order to sphericalize the particles, a residence time of at least 30 minutes is necessary. The spherical alumina particles prepared according to the above-mentioned process take the form of secondary agglomerated particles, and therefore, disintegration is carried out in a short time by using a known pulverizing means such as a ball mill, a shaking mill or a jet mill, whereby spherical corundum particles having a desired particle size distribution can be obtained.

If electrofused alumina or sintered alumina and aluminum hydroxide having a low content of a radioactive element such as uranium or thorium are used, spherical corundum particles having a small $\alpha$-ray radiant quantity can be prepared. If spherical alumina having a small $\alpha$-ray quantity (less than 0.01 C/cm$^2$.hr) is used as a filler of a sealing resin for highly integrated IC, LSI and VLSI, a greater effect of preventing an erroneous operation (so-called soft error) by $\alpha$-rays can be attained.

The process for the preparation of the above-mentioned spherical corundum particles will now be summarized. The process comprises the steps of (1) using electrofused alumina or sintered alumina having an average particle size of 5 to 35 $\mu$m, preferably 10 to 25 $\mu$m, as the starting material, or optionally, a mixture of said alumina with fine particles of aluminum hydroxide in an amount of 5 to 100% by weight based on said alumina as the starting material, (2) adding 0.1 to 4.0% by weight of a halogen compound, especially a fluorine compound such as $CaF_2$ or $AlF_3$, a boron compound such as $B_2O_3$ or $H_3BO_3$, a combination of a fluorine compound and a boron compound, or a borofluoride such as $NH_4BF_4$ to the starting material, (3) calcining the mixture at a temperature of at least 1000° C., preferably 1350° to 1550° C. and (4) lightly disintegrating the calcination product to single particles of $\alpha$-alumina (corundum).

If necessary, a step (5) of removing coarse particles (having a particle size exceeding 150 $\mu$m) by sieving may be optionally set. If the product is used in the field where a high hydrothermal resistance is required, for example, as an epoxy resin sealing material, a step (6) of refining the product by pickling or washing with deionized water becomes indispensable.

The spherical corundum particles prepared according to the above-mentioned process is valuable as a starting material of a finish wrapping material or as a base material of a refractory, glass or ceramics or a composite material thereof, but these spherical corundum particles are especially valuable as a filler of a composite material for an electronic part-mounting material or electronic part-sealing material.

The spherical corundum of the present invention consists of single particles of corundum and is characteristic over spherical alumina formed by the flame-spraying method or plasma-jet method, which is a mixed crystal of α-alumina and δ-alumina and is composed of fine agglomerated particles. For this reason, the spherical corundum of the present invention is especially suitable as a filler for rubbers and plastics having a high thermal conductivity.

As the polymer in which the spherical corundum particles are to be incorporated, there can be mentioned thermoplastic engineering plastics such as polyethylene, polypropylene, nylons, polycarbonates, and polyphenylene sulfide, thermosetting plastics such as epoxy resins, unsaturated polyester resins, and phenolic resins, and elastomers such as silicone rubbers. Epoxy resins used for sealing IC's and LSI's, such as phenol-novolak resins and novolak-epoxy resins, silicone resins, and silicone rubbers for heat sinks, are preferred as the polymer. The amount filled of the spherical corundum particles varies according to the use, but when the spherical corundum particles are used as a composition with a powdery resin for a semiconductor chip-mounting material, preferably the spherical corundum particles are filled in an amount of 80 to 92% by weight. If the amount filled of the spherical corundum particles is smaller than 80% by weight, a thermal conductivity higher than $60 \times 10^{-4}$ cal/cm. sec.°C. cannot be obtained, and if the amount filled of the spherical corundum particles exceeds 92% by weight, the plastic flowability of the composition becomes insufficient and molding is difficult.

In this case, the maximum particle size of the spherical corundum particles is 150 μm, and if particles having a size larger than this upper limit are incorporated, when the particles are filled in a rubber or plastic, the surface becomes rough and wear is increased, and good results cannot be obtained. There is a range of the average particle size suitable for attaining a good balance among the less abrasive property, the filling property, and the flowability. If the average particle size is smaller than 5 μm, the flowability is reduced, and if the average particle size exceeds 35 μm, the wear becomes larger than in the case of crystalline silica. It is especially preferable that the average particle size is from 10 to 25 μm.

The method for molding the highly thermally conductive rubber or plastic composition of the present invention is not particularly critical and an appropriate method is selected according to the kind of rubber or plastic. For example, known molding methods such as transfer molding, press molding, roll molding, and cast molding can be adopted.

However, when a semiconductor is sealed by transfermolding using a compound formed by incorporating spherical corundum particles as described above, a resin burr is likely to adhere to a lead frame acting as a lead terminal of an IC or a transistor, and the subsequent plating step is not easily performed or an operation of removing the burr must be additionally performed. This disadvantage can be eliminated by adding finely divided alumina B to spherical corundum particles A to adjust the particle size distribution. Namely, this plastic composition comprises (1) alumina consisting of 1 to 20% by weight of finely divided alumina B having an average particle size smaller than 5 μm, the remainder of the alumina consisting of spherical corundum particles A having a maximum single particle size smaller than 150 μm, an average particle size of at least 10 μm, and a shape not including cutting edges, and (2) at least one member selected from plastics used for semiconductor-sealing materials, such as epoxy resins and silicone resins.

The finely divided alumina B is incorporated in spherical corundum particles A in this composition because, since the proportion of particles having medium and fine particles is increased, the formation of a burr by bleeding of the resin from the spherical corundum particles can be prevented. Moreover, the mixing ratio of finely divided alumina B is limited to the above-mentioned range because, if the amount of finely divided alumina B is smaller than 1% by weight, the effect of preventing the formation of a burr is insufficient, and if the amount of finely divided alumina B is larger than 20% by weight, the wear property is increased or the moldability is degraded. The particles size of spherical corundum particles A is not particularly critical. However, if particles having a maximum particle size larger than 150 μm are present, since the hardness of alumina is high, even though it has a spherical shape, the abrasive property is increased and good results cannot be obtained. The average particle size of finely divided alumina B is limited to smaller than 5 μm because the wearing property is increased in the case of alumina having an average particle size exceeding this limit.

As is apparent from the foregoing description, this resin composition having a high thermal conductivity is especially suitable for sealing semiconductors and is characterized by the alumina incorporated, and this alumina is incorporated in a main component of a semiconductor-sealing material, such as an epoxy resin represented by a cresol-novolak type epoxy resin or a phenolic resin represented by a novolak type phenolic resin, as in the conventional technique. A filler other than alumina, for example, crystalline silica, a flame retardant, a lubricant, a parting agent, a colorant, and a coupling agent can be added, so far as the intended object is attained.

According to another valuable application mode of the present invention, the spherical corundum is incorporated in a liquid rubber or plastic. In this case, a rubber or plastic composition having a low viscosity and an excellent castability and roll processability can be obtained by using a mixture comprising spherical corundum particles A of the present invention and finely divided alumina B, at a B/(A+B) ratio of from 0.10 to 0.30.

Namely, this rubber or plastic composition having a high thermal conductivity comprises (1) alumina consisting of 10 to 30% by weight of finely divided alumina having an average particle size smaller than 5 μm, the remainder of the alumina consisting of spherical corundum particles having an average particle size of at least 10 μm, and (2) at least one member selected from rubbers and plastics, wherein the amount incorporated of the alumina is at least 75% by weight based on the total composition.

The spherical corundum particles A used in this composition have an average particle size of at least 10 μm. If the average particle size is smaller than 10 μm, the viscosity-reducing effect by the combined use of spherical corundum particles A with finely divided alumina B is insufficient and good results cannot be obtained. The process for the preparation of finely divided alumina is not particularly critical, but finely divided alumina having an average particle size smaller than 5 μm is used. This is because, if finely divided alumina having a larger average particle size is used, the viscosity of the composition is increased and a satisfactory effect cannot be attained.

By using alumina consisting of spherical corundum particles and 10 to 30% by weight (based on the total alumina) of finely divided alumina B, even if the alumina is incorporated in an amount of at least 75% by weight (based on the total composition), preferably at least 80% by weight, in a liquid rubber or plastic, an increase of the viscosity of the resin composition, which results in a degradation of the operation adaptability, can be prevented, and a rubber or plastic composition having a desired high thermal conductivity can be obtained. If the amount of finely divided alumina B is smaller than 10% by weight based on the total alumina, when the alumina is filled at a high ratio, the effect of reducing the viscosity of the liquid resin composition is insufficient, and if the amount of finely divided alumina B exceeds 30% by weight, the abrasive property is increased or the moldability is degraded. If the amount incorporated of the alumina is smaller than 75% by weight, a desired high thermal conductivity cannot be attained.

The kind of liquid rubber or plastic is not particularly critical, but epoxy resins, unsaturated polyester resins, phenolic resins, silicone resins, and silicone rubbers are preferred. A flame retardant, a colorant, a lubricant, a precipitation-preventing agent, a defoamer, and other fillers may be optionally added to the composition, so far as the intended object of the present invention is attained.

The present invention will now be described with reference to the following examples.

EXAMPLE 1

To 1000 g of commercially available pulverized sintered alumina (SRW-325F supplied by Showa Denko; average particle size=12 μm, maximum particle size=48 μm) were added 20 g of anhydrous aluminum fluoride of the reagent class and 20 g of boric acid of the reagent class. The mixture was charged in a heat-resistant vessel formed of an alumina ceramic and heated at 1450° C. for 3 hours in a kanthal electric furnace. The hardness of agglomerates was determined with respect to the withdrawn calcination product. The calcination product was disintegrated for 30 minutes in a vibration ball mill (SM-0.6 supplied by Kawasaki Jukogyo; 100 g of the calcination product and 1000 g of HD alumina balls having a diameter of 10 mm were charged). The $Na_2O$ content of the disintegration product was determined and the particle size distribution was determined by a laser diffraction technique (Cilas), and a scanning electron microscope photograph (2500 magnifications) was taken. The results are shown in the Example 1 Column in Table 1 and FIG. 1A.

EXAMPLE 2

A calcination product and a disintegration product thereof were prepared by using commercially available pulverized electrofused alumina RW-92(325F) supplied by Showa Denko; average particle size=13 μm, maximum particle size=48 μm. The additives, the amounts incorporated, and the preparation method were the same as described in Example 1. The hardness of agglomerates of the calcination product, the total $Na_2O$ content of the disintegration product, the particle size distribution, and the shape of a-alumina particles were determined in the same manner as described in Example 1. The results are shown in the Example 2 Column in Table 1 and FIG. 1B.

COMPARATIVE EXAMPLE 1

Figure 2A:

The same pulverized sintered alumina as used in Example 1 was heat-treated alone under the same conditions as described in Example 1, without the addition of the chemicals, and a calcination product and the disintegration product thereof were obtained. These samples were evaluated in the same manner as described in Example 1. The results are shown in the Comparative Example 1 Column in Table 1 and FIG. 2A

COMPARATIVE EXAMPLE 2

Figure 2B:

The same pulverized electrofused alumina as used in Example 2 was heat-treated alone under the same conditions as described in Example 2, without the addition of the chemicals, and the obtained calcination product and disintegration product were evaluated. The results are shown in the Comparative Example 2 Column in Table 1 and FIG. 2B.

Figure 1B:

From these results, it is seen that, in the corundum particles of the present invention (Examples 1 and 2), the average particle size was 16.0 μm and the maximum particle size was 50 μm (Table 1), and as shown in FIGS. 1A and 1B, the corundum particles had a rounded spherical shape having a size of 5 to 50 μm. On the other hand, no change of the shape was caused by the heat treatment in the samples of Comparative Examples 1 and 2, and it was confirmed that the particles had an irregular shape including sharp cutting edges.

TABLE 1

|  | Example 1 | Example 2 | Comparative Example 1 | Comparative Example 2 |
| --- | --- | --- | --- | --- |
| Starting Material | SRW (325F) | RW-92 (325F) | SRW (325F) | RW-92 (325F) |
| Crystal-Growing Agent | $AlF_3$ 2% | Same as in Example 1 | not added | not added |
|  | $H_3BO_3$ 2% | Same as in Example 1 |  |  |
| Heating Conditions | 1450° C. × 3 hours | | | |
| Hardness of Agglomerates | Slightly hard | Slightly hard | Slightly hard | Slightly hard |
| Analysis Volumes *1 | | | | |
| total sodium content ($Na_2O$) % | 0.01 | 0.01 | 0.15 | 0.07 |
| particle size distribution *2 | | | | |

TABLE 1-continued

|  | Example 1 | Example 2 | Comparative Example 1 | Comparative Example 2 |
| --- | --- | --- | --- | --- |
| +32 microns (%) | 9 | 12 | 6 | 8 |
| −10 microns (%) | 25 | 20 | 45 | 43 |
| average particle size (microns) | 16.0 | 18.5 | 12.0 | 13.0 |
| α-alumina particles *3 | | | | |
| Size | 5–50 microns | same as in Example 1 | 1–50 microns | same as in Comparative Example 1 |
| Shape | spherical | spherical | irregular | irregular |

From the results of the Examples and Comparative Examples, it is understood that the particles according to the present invention are quite different from the conventional particles having an irregular shape including sharp cutting edges, and are spherical corundum particles having a uniform shape and free of cutting edges.

EXAMPLE 3

The same sintered alumina as used in Example 1 was mixed with 10% by weight (exteriorly calculated as alumina) of finely divided aluminum hydroxide having an average diameter of 1 μm, and the same chemicals as used in Example 1 were added in the same amounts as in Example 1. The mixture was calcined and disintegrated in the same manner as described in Example 1. The obtained sample was evaluated in the same manner as described in Example 1. The results are shown in the Example 3 Column in Table 2.

EXAMPLE 4

The evaluation results of a sample obtained in the same manner as described in Example 3, except that the amount added of aluminum hydroxide was changed to 17% by weight, are shown in the Example 4 Column in Table 2.

EXAMPLE 5

The evaluation results of a sample obtained in the same manner as described in Example 3, except that the amount added of aluminum hydroxide was changed to 30% by weight, are shown in the Example 5 Column in Table 2.

COMPARATIVE EXAMPLE 3

The evaluation results of a sample obtained in the same manner as described in Example 5, except that the chemicals (anhydrous aluminum fluoride and boric acid) where not added are shown in the Comparative Example 3 Column in Table 2.

From the results of Examples 3 through 5 and Comparative Example 5, it is seen that, in the sample of Comparative Example 3 formed without the addition of chemicals, fine alumina particles formed from finely divided aluminum hydroxide were merely mixed with coarse sintered alumina particles and the shape of the latter particles was not changed, and that, in each of the samples of Examples 3 through 5 obtained by using chemicals, aluminum hydroxide was absorbed in the sintered alumina and coarse rounded spherical corundum particles were formed.

EXAMPLE 6

Sintered alumina SRW 325F was continuously supplied from a tail portion of a rotary kiln having a fuel burning zone temperature adjusted to about 1350° C., and simultaneously, ammonium borofluoride at a concentration of 0.2% by weight (based on alumina) was sprayed into the fuel burning zone by using compressed air. The amount supplied of the sintered alumina was adjusted so that the residence time in a calcining zone at a temperature higher than 1000° C. was about 3 hours. The calcination product withdrawn from the fuel burning zone was disintegrated for 15 minutes by a vibration ball mill, and the disintegration product was evaluated in the same manner as in Examples 1 through 5. Observation by a microscope revealed that the product consisted of coarse spherical particles having a size of about 3 to about 40 microns.

EXAMPLE 7

Commercially available coarse sintered alumina of the refractory aggregate grade (SRW 48F supplied by Showa Denko) was pulverized for 1 hour by a vibration ball mill and passed through a sieve (Tyler sieve; mesh size=104 microns). The residue on the sieve was removed. The alumina was mixed with 30% by weight of aluminum hydroxide having an average particle size of about 5 μm and with 2.0% by weight of anhydrous aluminum fluoride and 2.0% by weight of boric acid as the chemicals. The mixture was calcined and disintegrated in the same manner as described in Example 1. The evaluation results of the obtained sample are shown the Example 7 Column in Table 3.

EXAMPLE 8

Commercially available electrofused alumina [RW-92(220F) supplied by Showa Denko; average particle size=28.5 μm, maximum particle size=196 μm] was passed through a 150-mesh sieve, and the particles which had passed through the sieve were evaluated in the same manner as described in Example 7. The evaluation results are shown in the Example 8 Column in Table 3.

For comparison, the sample formed without the addition of aluminum hydroxide was similarly tested (the results are not shown).

Where the procedures of Examples 7 and 8 were repeated without the addition of aluminum hydroxide, the particles of the calcination product were bonded to one another in the semi-fused state, and disintegration by the mill was difficult. However, where aluminum hydroxide was incorporated, the calcination product could be easily disintegrated into primary particles.

TABLE 2

|  | Example 3 | Example 4 | Example 5 | Comparative Example 3 |
| --- | --- | --- | --- | --- |
| Starting Material |  |  |  |  |
| SRW 325F (Parts by Weight) | 100 | 100 | 100 | 100 |
| aluminum hydroxide (Parts by Weight) | 10 | 17 | 30 | 30 |
| Crystal-Growing Agents | $AlF_3$ 2% $H_3BO_3$ 2% | $AlF_3$ 2% $H_3BO_3$ 2% | $AlF_3$ 2% $H_3BO_3$ 2% | not added |
| Heating Conditions |  | 1450° C. × 3 hours |  |  |
| Hardness of Agglomerates | soft | soft | very soft | very soft |
| Analysis Volumes |  |  |  |  |
| total sodium content ($Na_2O$) % | 0.01 | 0.01 | 0.01 | 0.25 |
| particle size distribution |  |  |  |  |
| +32 microns (%) | 17 | 11 | 6 | 1 |
| −10 microns (%) | 22 | 28 | 30 | 63 |
| average particle size (microns) | 19.4 | 16.5 | 15.0 | 6.8 |
| α-alumina particles |  |  |  |  |
| Size (microns) | 5–50 | 4–50 | 3–50 |  |
| Shape | spherical | spherical | spherical, partially fine particles | mixture of irregular particles and fine particles |

TABLE 3

|  | Example 7 | Example 8 |
| --- | --- | --- |
| Starting Material | pulverized SRW 48F *1 | RW-92 (200F) |
| Aluminun Hydroxide (5 microns) | 30% | 30% |
| Crystal-Growing Agent | $AlF_3$ 2% | same as in Example 7 |
|  | $H_3BO_3$ 2% | same as in Example 7 |
| Heating Conditions | 1450° C. × 3 hours |  |
| Hardness of Calcination Product | very soft | very soft |
| Analysis Values |  |  |
| total sodium content ($Na_2O$ wt. %) | 0.02 | 0.02 |
| particle size distribution |  |  |
| +32 microns (%) | 26 | 35 |
| −10 microns (%) | 12 | 15 |
| average particle size (microns) | 21.7 | 25.6 |
| α-alumina particles |  |  |
| size | 5–80 microns | 5–80 microns |
| shape | spherical | spherical |

Note
*1 sample obtained by pulverization for 1 hour by vibrating ball mill and passing through 150-mesh sieve (average particle size was 11 microns).

With respect to the samples of Examples 7 and 8, the measurement of the particle size distribution and the electron microscope observation were carried out. It was confirmed that each of the products of Examples 7 and 8 consisted of spherical coarse particles of α-alumina (corundum) having a particle size of 5 to 80 microns.

EXAMPLE 9

Commercially available low-α-ray-radiant alumina (having an α-ray radiant quantity smaller than 0.01 $C/cm^2 \cdot hr$) was electrofused, and the obtained ingot was disintegrated, pulverized and classified under conditions such that a radioactive element was not included. The obtained electrofused alumina coarse particles having an average particle size of 20 microns and a maximum particle size of 74 microns (the α-ray radiant quantity was 0.005 $C/cm^2 \cdot hr$) were mixed with 30% by weight of aluminum hydroxide (average particle size of 5 microns) of the low α-ray-radiant type (α-ray radiant quantity was 0.005 $C/cm^2 \cdot hr$) obtained according to the known method, and 0.5% by weight of boric acid and 0.5% by weight of anhydrous aluminum fluoride were added as the chemical. The mixture was charged in a heat-resistant vessel formed of an alumina ceramic and heated at 1500° C. for 3 hours in a kanthal electric furnace. The calcination product was pulverized for about 30 minutes by a vibration ball mill. The particle size distribution was determined and the size and shape of the particles were evaluated by an electron microscope. It was confirmed that the starting particles were changed to spherical coarse α-alumina particles having a particle size of 3 to 50 microns. The α-ray radiant quantity of the sample was 0.004 $C/cm^2 \cdot hr$.

EXAMPLE 10

A basic recipe shown in Table 4 was set by using as the main component an epoxy resin for a sealing material for semiconductors.

TABLE 4

| Materials | Amounts (parts by weight) |
| --- | --- |
| epoxy resin *1 | 100 |
| phenolic resin *2 | 50 |
| curing promoter *3 | 1 |
| carnauba wax *4 | 3 |
| alumina | variable |

Note
*1 Sumiepoxy ESCN-220F (softening point = 77.6° C.) supplied by Sumitomo Chemical K.K.
*2 Sumilite Resin PR-51688 (softening point = 98° C.) supplied by Sumitomo Durez Co.
*3 Imidazole C-17Z supplied by Shikoku Kasei Kogyo K.K.
*4 supplied by Toa Chemical Industries Co., Ltd.

A composition comprising 650 parts (80.8% by weight), 850 parts (84.7% by weight) or 950 parts (86.0% by weight) of spherical corundum particles having the characteristics shown in Table 5 and prepared in Example 7 was kneaded for 3 minutes by two rolls having a surface temperature maintained at 105° to 115° C. After cooling, the product mass was disintegrated in a mortar and classified to a size smaller than 16 mesh. Tablets having a diameter of 50 mm were formed. With respect to each of the above-mentioned three compositions, the spiral flow (flow characteristic of the composition) and the thermal conductivity and thermal expansion coefficient of a test piece obtained by press molding were determined. The thermal conductivity was measured by the non-stationary hot wire method by using Shorthrerm ® QTM-D II supplied by Showa Denko, the thermal expansion coefficient was expressed by the thermal expansion coefficient $\alpha_1$ at temperatures lower than the glass transition temperature, and the thermal expansion coefficient $\alpha_2$ at temperatures higher than the glass transition temperature.

The spiral flow test was carried out according to EMMI-I-66 in the following manner. Namely, a spiral cavity mold was heated at 149±3° C. and the sample was collected in an amount such that the cull thickness was 0.30 to 0.35 cm, and molding was carried out under a pressure of 70±2 kg/cm². The distance which the sample moved along the spiral groove in the mold was measured. The result of the spiral test indicates the flowability of the sample and is important as a factor for evaluating the moldability.

In order to evaluate the abrasive property of the filler at the roll kneading step, the degree of contamination of the composition by wear of the hard chromium plating formed on the roll surface was judged with the naked eye. Namely, the degree of incorporation of a peeled piece (black) of the hard chromium plating in the composition (white) by friction between alumina and the roll surface was evaluated with the naked eye according to the following five stages: 1) no contamination, 2) faint contamination, 3) little contamination, 4) conspicuous contamination and 5) extreme contamination, and the degree of wear was determined by this contamination degree.

Note, in Table 5, the extraction impurities were measured by the pressure cooker test (160° C.×20 hours). The pH value shown was the pH value of the supernatant of a slurry containing 30% by weight of the sample. The loose bulk specific gravity was measured by allowing the sample to fall naturally in a graduated cylinder, and the heavily packed bulk specific gravity was measured by the tapping filling method. Furthermore, the average particle size was measured by the laser diffraction technique method (Cilas).

TABLE 5

| Sample Characteristics | | Spherical Corundum (Example) | Coarse Alumina (Comparative Example) |
|---|---|---|---|
| moisture | (%) | 0.01 | 0.02 |
| ignition loss | (%) | 0.02 | 0.05 |
| $Fe_2O_3$ | (%) | 0.02 | 0.09 |
| $SiO_2$ | (%) | 0.13 | 0.06 |
| $Na_2O$ | (%) | 0.02 | 0.20 |
| extraction impurities | | | |
| $Na^+$ ion | (ppm) | 15.0 | 50.0 |
| $Cl^-$ ion | (ppm) | 0.4 | 2.0 |
| extracted water electric conductivity | (μS/cm) | 30 | 60 |
| pH | (30% by weight) | 5.5 | 6.0 |
| bulk density gravity | (g/cm³) | | |
| loose | | 1.70 | 1.60 |
| packed | | 2.40 | 2.20 |
| average particle size | (μm) | 21.7 | 10.0 |
| BET (specific surface area) | (m²/g) | 0.35 | 0.75 |

COMPARATIVE EXAMPLE 4

A composition comprising 350 parts (70% by weight) of crystalline silica (Crystalite A-1 supplied by K. K. Tatsumori) having an average particle size of 9.7 μm and a maximum particle size of 48 μm or fused silica (FuseLex E-1 supplied by K. K. Tatsumori) having an average particle size of 12.1 μm and a maximum particle size of 48 μm instead of spherical corundum was prepared in the same manner as described in Example 10, and the composition was evaluated in the same manner as described in Example 10.

COMPARATIVE EXAMPLE 5

A composition comprising 650 parts of a sample formed by refining pulverized low-sodium alumina of the Bayer process (plate-like particles having an average size of 5 μm) by washing with pure water or a sample ("Coarse Alumina" in Table 5) obtained by purifying commercially available sintered alumina (SRW 325F supplied by Showa Denko) having an average particle size of 10.0 μm by washing with pure water, instead of the spherical corundum, was prepared in the same manner as in Example 10, and the characteristics were evaluated as in Example 10.

The results obtained in Example 10 and Comparative Examples 4 and 5 are shown in Table 6.

TABLE 6

| | Example 10 | | | Comparative Example 4 | | Comparative Example 5 | |
|---|---|---|---|---|---|---|---|
| Kind of Filler | | | | | | | |
| Alumina | | | | | | | |
| spherical corundum | 650 | 850 | 950 | | | | |
| alumina by Bayer process | | | | | | 650 | |
| sintered alumina | | | | | | | 650 |
| Silica | | | | | | | |
| fused silica | | | | 350 | | | |
| crystalline silica | | | | | 350 | | |
| Characteristics of Composition | | | | | | | |
| wearing index | 2 | 3 | 3 | 1 | 3 | 4 | 5 |
| spiral flow length (cm) | 65 | 45 | 37 | 47 | 95 | 20 | 39 |
| thermal conductivity (× $10^{-4}$ cal/cm · sec · °C.) | 62 | 75 | 84 | 16 | 34 | 55 | 53 |
| thermal expansion coefficient $\alpha_1$ (× $10^{-5}$/°C.) | 2.2 | 1.9 | 1.8 | 1.9 | 3.4 | 1.9 | 2.2 |
| thermal expansion coefficient $\alpha_2$ (× $10^{-5}$/°C.) | 6.6 | 6.0 | 5.8 | 5.6 | 8.1 | 5.8 | 7.0 |

TABLE 6-continued

|  | Example 10 | | Comparative Example 4 | | Comparative Example 5 | |
| --- | --- | --- | --- | --- | --- | --- |
| glass transition temperature (°C.) | 179 | 175 | 173 | 178 | 173 | 172 | 173 |

As is apparent from the foregoing results, the spherical corundum of the present invention can be easily filled in a resin even at a weight ratio higher than 80% by weight, the wear by the spherical corundum of the present invention is much lower than that of crystalline silica, alumina by the Bayer process and sintered alumina, and the flowability represented by the spiral flow length is greatly improved. Accordingly, a thermal conductivity higher than $60 \times 10^{-4}$ cal/cm·sec·°C. can be easily obtained, and by increasing the amount incorporated of the spherical corundum, a low thermal expansion coefficient comparable to that of the fused silica-containing composition can be obtained.

EXAMPLE 11

A composition was prepared by using an epoxy resin having a softening point of 68.6° C. (Smiepoxy ESCN-220-3 supplied by Sumitomo Chemical K.K.) instead of the epoxy resin used in Example 10, changing the phenolic resin used as the curing agent in Example 10 to a phenolic resin having a softening point of 79° C. (Shonol BRG-556 supplied by Showa Highpolymer Co., Ltd.) and incorporating 1050 parts (87.5% by weight) of spherical corundum shown in Table 5 without changing the amounts of other additives used in Example 10, and the characteristics of the composition were evaluated in the same manner as described in Example 10.

It was found that the wear index of the composition was 3, the spiral flow length was 40 cm, the thermal conductivity was $93 \times 10^{-4}$ cal/cm·sec·°C., and the thermal expansion coefficient $\alpha_1$ was $1.7 \times 10^{-5}$/°C.

COMPARATIVE EXAMPLE 6

Spherical corundum purified products having average particle sizes of about 4 μm and about 40 μm, respectively, were prepared from sintered alumina finely divided into an average particle size of 3 μm and sintered alumina having an average particle size of 37 μm, respectively. It was intended to prepare compositions by using these spherical corundum purified products in the same manner as described in Example 11. In the case of alumina having an average particle size of 4 μm, the composition became hard and roll kneading was impossible. In the case of alumina having an average particle size of 40 μm, kneading was relatively easy but the wear index was increased because the particle size was too large.

EXAMPLES 12 THROUGH 14 AND COMPARATIVE EXAMPLES 7 THROUGH 11

Three kinds of alumina particles having characteristics shown in Table 7, that is, spherical alumina A, fine alumina B and medium alumina C, were mixed at a ratio shown in Table 8 to form a mixed filler. The filler was incorporated in an amount shown in Table 9 into a resin to form a semiconductor-sealing resin composition.

With respect to the obtained material, the spiral flow length was measured according to the EMMI method, and the length of the resin burr was measured. Moreover, in order to evaluate the wear property of the compound, the contamination of the compound with the hard chromium plating formed on the roll surface at the roll kneading step was judged with the naked eye and expressed by the index.

TABLE 7

|  | Spherical Alumina A[1] | Fine Alumina B[2] | Medium Alumina C[3] |
| --- | --- | --- | --- |
| Average Particle Size | 20 | 1.5 | 10 |
| Maximum Particle Size | 64 | 6 | 32 |
| Shape | spherical | irregular | irregular |

Note
[1] spherical corundum
[2] AL-45-1 supplied by Showa Denko K.K.
[3] SRW 325F supplied by Showa Denko K.K.

TABLE 8

|  | Example No. | | | Comparative Example No. | | | | |
| --- | --- | --- | --- | --- | --- | --- | --- | --- |
|  | 12 | 13 | 14 | 7 | 8 | 9 | 10 | 11 |
| Mixing Ratio (%) | | | | | | | | |
| spherical corundum A[1] | 99 | 90 | 80 | 100 | 70 | 50 |  | 80 |
| fine corundum B[2] | 1 | 10 | 20 |  | 30 | 50 | 100 |  |
| medium corundum C[3] |  |  |  |  |  |  |  | 20 |

TABLE 9

| Materials | Amounts (g) |
| --- | --- |
| Epoxy Resin 1) | 100 |
| Phenolic Resin 2) | 50 |
| Curing Promoter 3) | 1 |
| Mold Release 4) | 3 |
| Alumina | 850 |

Note
1) ESCN-220-3 supplied by Sumitomo Chemical K.K.
2) BRG-556 supplied by Showa Highpolymer Co., Ltd.
3) C-17Z supplied by Shikoku Chemical K.K.
4) carnauba wax supplied by Hoechst The length of the resin burr referred to herein means the length of a burr formed when the molding material was transfer-molded at a width of 10 mm and a slit thickness of 10, 30, 75 or 98 μm. If the burr length is smaller than 10 mm at each slit thickness, no problem arises.

TABLE 10

|  | Example No. | | | Comparative Example No. | | | | |
| --- | --- | --- | --- | --- | --- | --- | --- | --- |
|  | 12 | 13 | 14 | 7 | 8 | 9 | 10 | 11 |
| Ratio | | | | | | | | |
| B/A + B | 0.01 | 0.10 | 0.20 | 0 | 0.30 | 0.50 | 1.00 | — |
| Characteristics | | | | | | | | |
| spiral flow length (cm)[1] | 55 | 60 | 62 | 52 | 55 | 35 | 29 | 38 |
| Wear index[2] | 2 | 2 | 2 | 2 | 3 | 4 | 5 | 5 |

TABLE 10-continued

|  | Example No. | | | Comparative Example No. | | | | |
| --- | --- | --- | --- | --- | --- | --- | --- | --- |
|  | 12 | 13 | 14 | 7 | 8 | 9 | 10 | 11 |
| burr strength (mm) | | | | | | | | |
| 10 μm | 4 | 2 | 2 | 11 | 2 | 7 | 30 | 20 |
| 30 μm | 6 | 3 | 3 | 25 | 8 | 10 | 45 | 26 |
| 76 μm | 8 | 4 | 4 | 38 | 10 | 15 | 50 | 41 |
| 98 μm | 10 | 5 | 5 | 45 | 15 | 20 | 50 | 50 |

Note
[1] 149 ± 3° C., 70 ± 2 kg/cm$^2$
[2] 1: no contamination
2: faint contamination
3: little contamination
4: conspicious contamination
5: extreme contamination As is apparent from the test results shown in Table 10, only in Examples 12 through 14 were the added alumina was fine alumina B and the mixing ratio was 0.01 to 0.20, was the wear property low, the formation of a resin burr controlled, and the flowability represented by the spiral flow length large.

In Comparative Examples 8 and 9, where even if the added alumina was alumina B, the ratio of the alumina B was outside the range specified in the present invention, the wear index was increased although formation of a burr was controlled to a certain extent. In Comparative Example 10, where all of the filled alumina was the fine alumina, wear was extreme, the flowability was reduced, the burr length was large, and a satisfactory material could not be obtained. In Comparative Example 11, where the added alumina was medium alumina having an average particle size exceeding 5 microns, the spiral flow length was short, wear was extreme, and the formation of burrs was not controlled.

Note, the thermal conductivities obtained in these examples were 74 to 75×10$^{-4}$ cal/cm·sec·°C.

EXAMPLES 15 THROUGH 18 AND COMPARATIVE EXAMPLES 12 THROUGH 17

The alumina shown in Table 11 was incorporated at a ratio shown in Table 12 into an epoxy resin to obtain a resin composition having a high thermal conductivity. The mixing ratio of the alumina particles in the added alumina was as shown in Table 13. Note, alumina B, alumina C, and alumina D were according to the Bayer process.

TABLE 11

|  | Characteristics of Alumina | | | | | |
| --- | --- | --- | --- | --- | --- | --- |
| Items | Spherical Corundum A | Fine Alumina B | Medium Alumina C | Medium Alumina D | Sintered Alumina E | Spherical Corundum F |
| Average Particle Size (μm) | 20 | 1 | 6 | 8 | 12 | 9 |
| Maximum Particle Size (μm) | 64 | 12 | 16 | 24 | 32 | 48 |

TABLE 12

| Material | Mixing Ratio Amount Incorporated |
| --- | --- |
| Epoxy Resin[1] | 50 g |
| Curing Agent[2] | 40 g |
| Alumina | 200–400 g |

Note
[1] Epikote 815 supplied by Shell Chemical
[2] HN-2200 supplied by Hitachi Chemical Co., Ltd.

TABLE 13

|  | Composition (%) of Added Alumina | | | | | | | | |
| --- | --- | --- | --- | --- | --- | --- | --- | --- | --- |
|  | Example No. | | | Comparative Example No. | | | | | |
|  | 15 | 16 | 17 | 12 | 13 | 14 | 15 | 16 | 17 |
| Spherical Corundum A | 90 | 80 | 70 | 100 | 60 | 80 | | | |
| Fine Alumina B | 10 | 20 | 30 | | 40 | | | | 20 |
| Medium Alumina C | | | | | | 20 | | | |
| Medium Alumina D | | | | | | | 100 | | |
| Sintered Alumina E | | | | | | | | 100 | |
| Spherical Corundum F | | | | | | | | | 80 |

The viscosity of each of the so-obtained compounds was measured, and the results are shown in Table 14.

TABLE 14

|  | Viscosity (poise) of Compound | | | | | | | | |
| --- | --- | --- | --- | --- | --- | --- | --- | --- | --- |
| Amount (g) of Added Alumina | Example No. | | | Comparative Example No. | | | | | |
|  | 15 | 16 | 17 | 12 | 13 | 14 | 15 | 16 | 17 |
| 200 | 69 | 65 | 68 | 70 | 85 | 70 | 232 | 172 | 125 |
| 250 | 130 | 105 | 135 | 153 | 192 | 148 | 785 | 671 | 391 |
| 300 | 226 | 173 | 229 | 371 | 503 | 335 | 1920 | 2390 | 980 |
| 350 | 478 | 358 | 500 | 750 | 1020 | 721 | above 3000 | above 3000 | 1970 |
| 400 | 724 | 550 | 770 | 1300 | 1630 | 1250 | above | above | above |

TABLE 14-continued

| Amount (g) of Added Alumina | Viscosity (poise) of Compound | | | | | | | | |
|---|---|---|---|---|---|---|---|---|---|
| | Example No. | | | Comparative Example No. | | | | | |
| | 15 | 16 | 17 | 12 | 13 | 14 | 15 | 16 | 17 |
| | | | | | | | 3000 | 3000 | 3000 |

From the experimental results shown in Table 14, it is seen that, only when the fine alumina having an average particle size smaller than 5 μm was incorporated in an amount of 10 to 30% by weight in spherical corundum, was the viscosity of the resulting compound low and the compound had a good operation adaptability even if the alumina was added in a large amount. In Comparative Example 12, where spherical corundum alone was incorporated, or in Comparative Example 13, where the ratio of fine alumina to spherical corundum was outside the range specified in the present invention, the viscosity was increased. In Comparative Example 14 where the average particle size of added fine alumina was larger than 5 μm, even if the mixing ratio of the fine alumina was 10 to 30% by weight, when the alumina filler was incorporated in a large amount, the viscosity was high and a compound having a good operation adaptability could not be obtained. Similarly, in Comparative Example 15, where the particle size of the added alumina was relatively large, in Comparative Example 16, where the pulverized sintered alumina was incorporated, or in Comparative Example 17, where the average particle size of spherical corundum particles was smaller than 10 μm, a satisfactory compound was not obtained.

The alumina filler was gradually added to the resin, and when the viscosity of the compound reached 500 poise, the ratio of the alumina in the compound was determined. The compound at this time was cured and the thermal conductivity was measured. The results are shown in Table 15.

TABLE 15

| | Example No. | | | Comparative Example No. | | | | | |
|---|---|---|---|---|---|---|---|---|---|
| | 15 | 16 | 17 | 12 | 13 | 14 | 15 | 16 | 17 |
| Ratio (% by weight) of Alumina at which Viscosity Reached 500 poise | 80 | 81 | 80 | 78 | 77 | 79 | 72 | 73 | 74 |
| Thermal Conductivity $10^{-4}$ cal/cm · sec · °C. | 53 | 56 | 53 | 45 | 42 | 49 | 31 | 33 | 35 |

It is considered that the operation adaptability of a liquid compound is drastically degraded if the viscosity of the compound exceeds 500 poise. As is seen from Table 15, only in Examples 15 through 17 where spherical corundum particles containing 10 to 30% by weight of fine alumina having an average particle size smaller than 5 μm were incorporated, was the viscosity of the compound lower than 500 poise even if the alumina was incorporated in an amount of 80% or more, and a thermal conductivity higher than $50 \times 10^{-4}$ cal/cm·sec·°C. obtained. On the other hand, where only spherical corundum particles were used, as in Comparative Example 12, or where the average particle size of the added alumina was larger than 5 μm or the average particle size of the added alumina was smaller than 5 μm, the mixing ratio of the added alumina was outside the range of 10 to 30% by weight, as in Comparative Examples 13 through 14, or in where pulverized sintered alumina having a relatively large particle size or medium Bayer alumina process spherical corundum having an average particle size smaller than 10 μm was used, as in Comparative Examples 15 through 17, the viscosity reached 500 poise when the amount added of the alumina was still small, and therefore, a compound providing a high thermal conductivity could not be obtained.

INDUSTRIAL APPLICABILITY

The spherical corundum of the present invention has a low abrasive property and excellent flow characteristics and is valuable as a filler for a sealing material for electronic parts, a starting material of a finish wrapping material, a base material of a refractory, glass or ceramic. Moreover, a rubber or plastic composition comprising a high concentration of this spherical corundum has a high thermal conductivity and a low thermal expansion coefficient, and therefore, this composition is especially valuable as an insulating sealing material for a semiconductor device.

We claim:

1. A process for producing corundum particles without cutting edges, comprising the steps of:
    preparing corundum having developed crystals by an electrofusion or sintering method,
    pulverizing said corundum to corundum particles having a maximum particle size smaller than 150 μm and an average particle size of 5 to 35 μm as single particles and having cutting edges,
    adding one or more members selected from the group consisting of halogen compounds, boron compounds and alumina hydrates to said corundum particles produced by pulverization, wherein the halogen compounds and boron compounds are added in an amount of 0.1 to 4.0 parts by weight based on 100 parts by weight of total amount of alumina, wherein the total amount of alumina includes an aluminum hydroxide which is present, and wherein the alumina hydrates are added in an amount of 5 to 100 parts by weight per 100 parts by weight of the corundum particles when the alumina hydrates are aluminum hydroxide, and
    heating the resultant mixture of the corundum particles produced by pulverization and said one or more members at a temperature of at least 1000° C. to remove the cutting edges of the corundum particles produced by pulverization.

2. A process according to claim 1, wherein said one or more members are selected from the group consisting of halogen compounds and boron compounds.

3. A process for the preparation of corundum particles without cutting edges wherein the process comprises adding 0.1 to 4.0 parts by weight of one or more members selected from the group consisting of halogen compounds and boron compounds to 100 parts by weight of a pulverized product of at least one of electrofused alumina and sintered alumina, which has a maximum particle size smaller than 150 μm and an average particle size of 5 to 35 μm as single particles; heat treating the mixture at a temperature of at least 1000° C.; and disintegrating the heat-treated product.

4. A process for the preparation of corundum particles without cutting edges, wherein the process comprises adding one or more members selected from the group consisting of halogen compounds and boron compounds to 100 parts by weight of a pulverized product of at least one of electrofused alumina and sintered alumina and 5 to 100 parts by weight of aluminum hydroxide, the amount of said one or more members of the halogen and boron compounds being 0.1 to 4.0 parts by weight based on 100 parts by weight of the total amount of the alumina and aluminum hydroxide, the alumina having a maximum particle size smaller than 150 $\mu$m and an average particle size of 5 to 35 $\mu$m as single particles; heat treating the mixture at a temperature of at least 1000° C.; and disintegrating the heat-treated product.

5. A process for the preparation of corundum particles without cutting edges according to claim 3, wherein the heat treatment is carried out at 1000° to 1550° C.

6. A process for the preparation of corundum particles without cutting edges according to claim 3, wherein the halogen compound is one or more members selected from the group consisting of $AlF_3$, $NaF$, $CaF_2$, $MgF_2$ and $Na_3AlF_6$.

7. A process for the preparation of corundum particles without cutting edges according to claim 3, wherein the boron compound is one or more members selected from the group consisting of $B_2O_3$, $H_3BO_3$, $mNa_2O.nB_2O_3$ and borofluorides.

8. A process for the preparation of corundum particles according to claim 4, wherein the heat treatment is carried out at 1000° to 1550° C.

9. A process for the preparation of corundum particles without cutting edges according to claim 4, wherein the halogen compound is one or more members selected from the group consisting of $AlF_3$, $NaF$, $CaF_2$, $MgF_2$ and $Na_3AlF_6$.

10. A process for the preparation of corundum particles without cutting edges according to claim 4, wherein the boron compound is one or more members selected from the group consisting of $B_2O_3$, $H_3BO_3$, $mNa_2O.nB_2O_3$ and borofluorides.

* * * * *